United States Patent [19]

Mizusawa

[11] 4,284,378
[45] Aug. 18, 1981

[54] FASTENER FOR PANELS
[75] Inventor: Akira Mizusawa, Fujisawa, Japan
[73] Assignee: Nifco Inc., Yokohama, Japan
[21] Appl. No.: 57,534
[22] Filed: Jul. 13, 1979
[30] Foreign Application Priority Data
  Jul. 18, 1978 [JP] Japan .................... 53/86784
[51] Int. Cl.³ .................... F16B 13/04
[52] U.S. Cl. .................... 411/21; 411/40; 411/50
[58] Field of Search .................... 85/72, 75, 76, 80, 81, 85/85; 151/41.75

[56] References Cited

U.S. PATENT DOCUMENTS

| | | | |
|---|---|---|---|
| 3,126,038 | 3/1964 | Jaworski | 85/80 |
| 3,192,823 | 7/1965 | Munse | 85/80 |
| 3,313,083 | 4/1967 | Flora | 85/72 X |
| 3,623,396 | 11/1971 | Mortensen | 85/75 |
| 3,651,734 | 3/1972 | McSherry | 151/41.75 X |
| 3,877,342 | 4/1975 | Duchatellier | 85/75 |

FOREIGN PATENT DOCUMENTS 1450998  4/1969  Fed. Rep. of Germany .......... 85/80

*Primary Examiner*—Thomas J. Holko
*Attorney, Agent, or Firm*—J. R. Halvorsen; T. W. Buckman

[57] ABSTRACT

A fastener for panels, comprising a basal body provided with a flange portion having a circular perforation bored in the central portion thereof for permitting insertion therethrough of a screw and with a pair of legs extended downwardly from the lower surface of the flange portion so as to be opposed to each other across the line drawn perpendicularly through the center of the circular perforation, and a screw receiving body disposed between the opposed legs, provided in the upper portion thereof with a pair of receiving pieces protruding sideways out of the openings formed between the opposed legs and further provided with a screw receiving hole in the axial portion coinciding with the perpendicular line drawn through the center of the perforation. The screw receiving body is provided with engaging protuberances one each on the lateral surfaces thereof opposite the legs and the legs are provided with oblong guide holes adapted to receive the engaging protuberances. The work of setting the engaging protuberances into sliding engagement with the oblong guide holes and tightening a screw inserted past the perforation of the flange portion into the screw receiving hole of the screw receiving body causes the receiving pieces of the screw receiving body to be slid in the direction of the flange portion of the basal body and thereby enables a panel to be held fast between the flange portion and the receiving pieces or panels one each between the head of the screw and the flange portion and between the flange portion and the receiving pieces.

4 Claims, 11 Drawing Figures

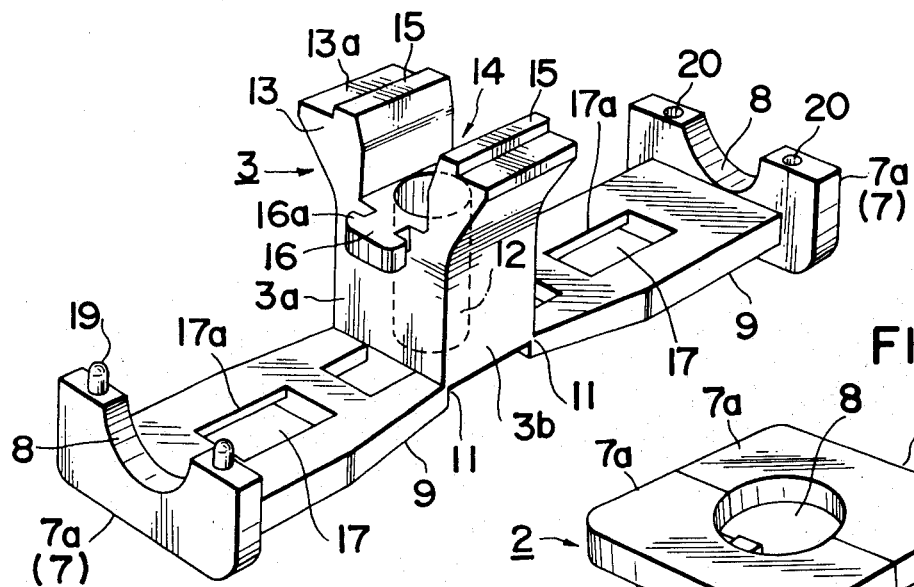
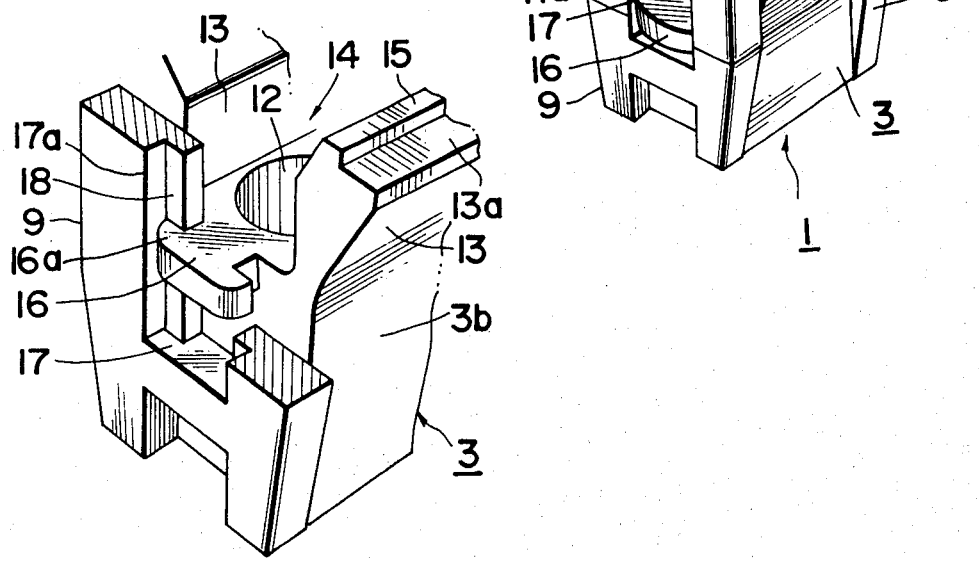

FASTENER FOR PANELS

BACKGROUND OF THE INVENTION

This invention relates to a fastener to be used for securing one panel onto some other panel which has already been fixed in position.

Generally, screws are used when panels or parts are secured onto fundamental panels which have already been fixed in position. Where such fundamental panels happen to be made of metallic materials, the fastening of panels or parts is effected in some cases by means of tapping screws which are directly driven into the metal panels. In most cases, however, there are generally used fasteners made of synthetic resins for the purpose of facilitating the fastening itself and, at the same time, ensuring rigid fastening.

A good many kinds of fasteners heretofore have been suggested and actually adopted for uses of this nature.

This synthetic resin fastener is so constructed that desired fastening of an attaching panel or part onto a stationary panel is accomplished by inserting the pair of legs of the fastener into an angular fitting hole formed in advance in the stationary panel until the lower surface of the flange of the fastener comes into intimate contact with the surface of the stationary panel, then placing the attaching panel or part on the stationary panel in such a way that the fitting lug of the attaching panel or part rests fast on the upper surface of the flange, thereafter inserting a screw first through the hole punched in advance through the fitting lug of the attaching panel or part and then through the perforation in the flange, allowing the leading portion of the inserted screw to force its way between the opposed legs inserted in the aforementioned fitting hole for thereby causing the opposed legs to be diverged and pressed into tight engagement with the inner wall of the fitting hole.

The conventional fastener described above fully serves its purpose when the fitting hole in the panel is capable of thoroughly withstanding the increasing pressure exerted thereon by the legs being diverged because of the forced advance of the screw, namely when the panel in which the fitting hole is formed retains high strength as in a metal plate in spite of the aforementioned exertion of pressure. When the basal panel itself is weak as in the case of a plate made of synthetic resin, the fitting hole formed therein is spread out by the legs being diverged as described above. In this case, therefore, the fastener may at times fail to come into ample fast engagement with the legs and prove to be useless for the purpose.

Since the conventional fastener is constructed in such a way that the forward ends of the inserted legs are diverged by the forced advance of the screw and the attaching panel or part is fastened onto the stationary panel without the slightest play by having the edge of the fitting hole pinched tightly between the diverged legs and the flange, the effectiveness of the fastener hinges heavily upon the thickness of the panel. Thus, the fastener has the disadvantage that it ceases to provide effective fastening when the thickness of the panel increases beyond a certain level.

This invention has issued from a research carried out to cope with the various problems entailed by the conventional fasteners.

A major object of this invention is to provide a fastener for panels, which is not affected by the material of the basal panel so that it can be effectively used on a panel such as of synthetic resin possessed of less strength than a panel of metal and which permits a greater change in the panel thickness than the conventional fasteners of a similar kind.

Another object of this invention is to provide a fastener for panels, which permits desired fastening of an attaching panel or part to the stationary panel to be effected without suffering the fitting hole formed in the panel to be enlarged in diameter owing to the insertion of the fastener.

A further object of this invention is to provide a fastener for panels, which is so designed that the fastener composed of substantially two members will be integrally molded of synthetic resin to suit mass production.

SUMMARY OF THE INVENTION

To accomplish the objects described above according to the present invention, there is provided a fastener for panels, which fastener comprises a basal body provided with a flange portion having a circular perforation bored in the central portion thereof for permitting insertion therethrough of a screw and with a pair of legs extended downwardly from the lower surface of the flange portion so as to be opposed to each other across the line drawn perpendicularly through the center of the circular perforation, and a screw receiving body disposed between the opposed legs, provided in the upper portion thereof with a pair of receiving pieces protruding sideways out of the openings formed between the opposed legs and further provided with a screw receiving hole in the axial portion coinciding with the perpendicular line drawn through the center of the perforation, the screw receiving body being provided with engaging protuberances one each on the lateral surfaces thereof opposite the legs and the legs being provided with oblong guide holes adapted to receive the engaging protuberances into sliding contact, whereby the work of tightening a screw inserted past the perforation of the flange portion into the screw receiving hole of the screw receiving body causes the receiving pieces of the screw receiving body to be slid in the direction of the flange portion of the basal body and enables a panel interposed between the flange portion and the receiving pieces to be held in position therebetween.

BRIEF EXPLANATION OF THE DRAWING

The illustrated preferred embodiment represents one typical fastener which can be manufactured most easily and inexpensively by working the present invention.

FIG. 9 is a perspective view of the basal body of the fastener of FIG. 1 in an extended state.

FIG. 10 is a perspective view of the basal body in an assembled state.

FIG. 11 is a partially cutaway perspective view illustrating the relationship of the legs of the basal body and the screw socket for their mutual engagement.

Figure 1:
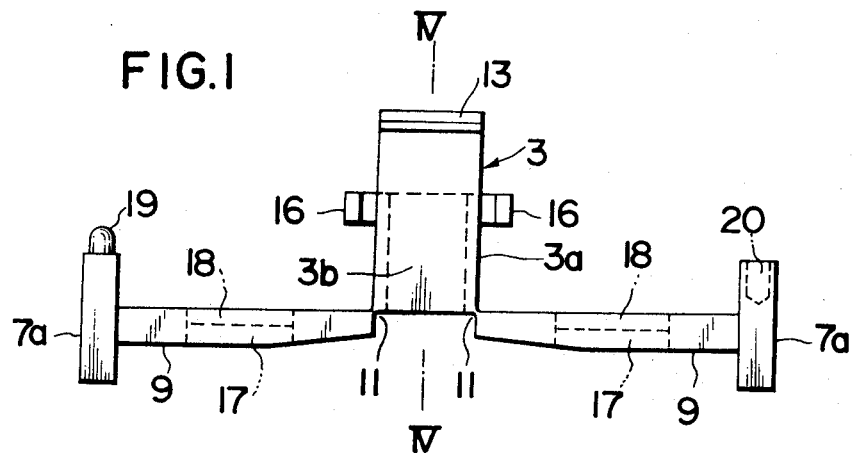
FIG. 1 is a front view of the basal body of the fastener for panels of the present invention as held in an extended state prior to actual use.

Now, the present invention will be described more specifically with reference to the illustrated preferred embodiment.

DETAILED DESCRIPTION OF THE PREFERRED EMBODIMENT

In the drawing, symbols 1, 2 and 3 represent a fastener, a basal body of which the fastener is made and a screw receiving body respectively. By 4 is represented a stationary panel, by 5 an attaching panel which is to be fastened onto the stationary panel 4, and by 6 a screw to be used for fastening the panels 4, 5 through the medium of the aforementioned fastener 1.

The aforementioned basal body 2 which constitutes the fastener 1 is composed of a flange portion 7 having a perforation 8 formed vertically through the center thereof and a pair of legs 9, 9 extended downward from the lower surface of the flange portion 7.

In the present preferred embodiment, for the reason to be described afterward, the aforementioned flange portion 7 is separated into two parts 7a, 7a opposed to each other across the central part of the perforation 8 as illustrated. In consequence of this separation of the flange portion 7, the pair of legs 9, 9 extended downwardly from the lower surface of the flange portion 7 are disposed so that they will hang down one each from the lower surface of the portions 7a, 7a respectively without obstructing the perforation 8 at all. The lower ends of these legs 9, 9 are connected to the lower end of the screw receiving body 3 through the medium of thin-walled hinges 11, 11.

The aforementioned screw receiving body 3 is formed in the shape of an angular pillar having a rectangular cross section, and the opposite lateral surfaces 3a, 3a of this angular screw receiving body 3 greater in width than in height are connected at their respective lower ends to the corresponding lower ends of the aforementioned legs 9, 9. This screw receiving body 3 is provided with a screw receiving hole 12 perforated vertically therethrough in the axial portion thereof. In the upper portion, the screw receiving body 3 is provided with a pair of receiving pieces 13, 13 which are disposed so as not to obstruct the opening of the aforementioned screw receiving hole 12.

The aforementioned receiving pieces 13, 13 rise in a state opposed to each other across the opening of the screw receiving hole 12 so as to give rise to a gap 14 therebetween. At the same time, receiving parts 13a, 13a are provided one each on the rear surfaces of the receiving pieces which are flush with the opposite lateral surfaces 3b, 3b of the screw receiving body 3. These receiving parts 13a, 13a are formed to protrude outwardly from the aforementioned lateral surfaces 3b, 3b. The receiving pieces 13, 13 are further provided on the upper surface thereof with engaging parts 15, 15 which are formed in the shape of a trapezoid surface for safe engagement with the edges of a fitting hole to be formed in the stationary panel 4 as described hereinafter.

Represented by 16, 16 are engaging protuberances formed so as to protrude from the opposite lateral surfaces 3a, 3a of the screw receiving body 3 constructed as described above, and by 17, 17 are oblong guide holes formed one each in the legs of the aforementioned basal body so as to be kept in sliding contact with the engaging protuberances.

The engaging protuberances 16, 16 which are flush with the upper end of the screw receiving body 3 are extended perpendicularly from the central portions of the opposite lateral surfaces 3a, 3a and are swelled sideways in the opposite directions at the leading ends so as to incorporate therein engaging parts 16a, 16a. On the other hand, the oblong guide holes 17, 17 are longitudinally formed by being punched along the common central line of the legs in such parts of the entire lengths of the legs as to correspond exactly to the respective engaging protuberances. Throughout the entire length of the opposed edges 17a, 17a defining the guide holes, there are provided stepped portions 18, 18 adapted to be secured on the engaging parts 16a, 16a of the aforementioned engaging protuberances.

The basal body 2 and the screw receiving body 3 which are constructed as described above are integrally molded of a synthetic resin material in a manner having the lower ends of the legs 9, 9 and the lower ends of the screw receiving body connected through the medium of the hinges 11, 11. These two bodies so constructed are assembled into one fastener by bending the legs 9, 9 upwardly at the hinges 11, 11 until they are brought closer toward the opposite lateral surfaces of the screw receiving body 3, allowing the aforementioned engaging protuberances 16, 16 rising perpendicularly from the lateral surfaces to enter the respective oblong guide holes 17, 17 and bringing the engaging parts 16a, 16a into engagement with the stepped portions 18, 18 formed along the opposed edges 17a, 17a of the oblong guide holes.

In consequence of the assemblage mentioned above, the portions 7a, 7a provided at the upper ends of the legs 9, 9 are abutted against each other on the screw receiving body 3 and are united by causing projections 19, 19 jutting out of the abutting surface of one of the portions 7a, 7a and depressions 20, 20 formed under the abutting surface of remaining one of the portions 7a, 7a to be coupled with each other, whereby the portions 7a, 7a give rise to one flange portion 7.

In the fastener 1 which has been brought into its assembled form as illustrated, the screw receiving body 3 is interposed between the legs 9, 9 hanging down from the flange portion 7 of the basal body, the flange portion 7 is disposed at a vertical distance from the upper surface of the screw receiving body 3, and the perforation 8 formed at the center of the flange portion 7 is disposed directly above the screw receiving hole 12 formed in the axial portion of the screw receiving body 3. In the assembled state, the screw receiving body 3 causes the engaging protuberances 16, 16 formed on the opposite lateral surfaces 3a, 3a to be positioned at the lower ends of the oblong guide holes 17, 17 of the legs 9, 9 allows the receiving parts 13a, 13a of the receiving pieces 13, 13 provided in the upper portion to protrude from the opposite sides of the legs 9, 9 and opposes the upper surface of the receiving parts 13a, 13a to the lower surface of the aforementioned flange portion 7. (See FIG. 10.)

Figure 5:
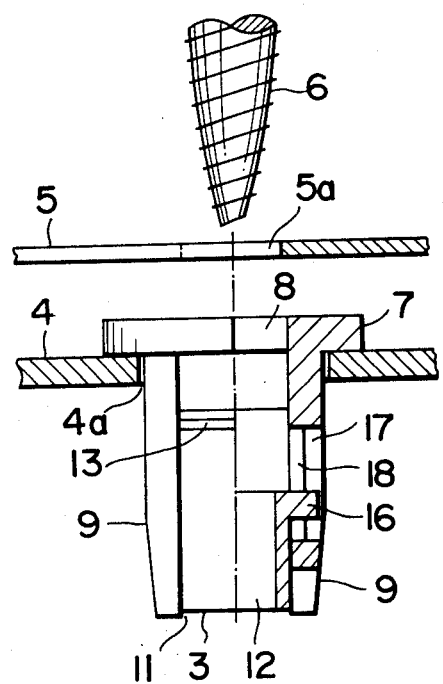
FIG. 5 is a front view of the fastener held in a position mounted on a stationary basal panel, with the righthand half portion thereof sectioned.
Figure 6:
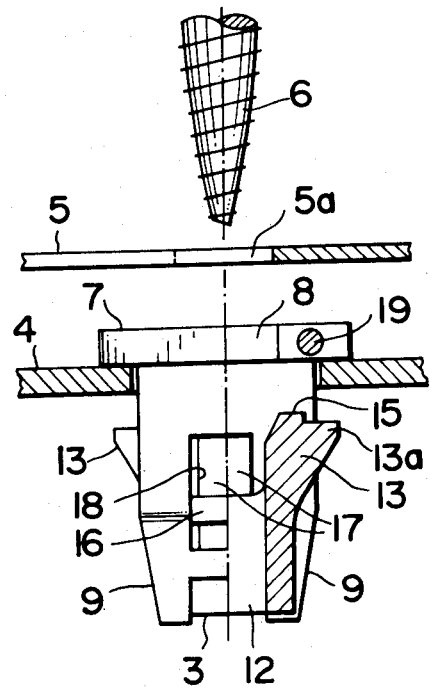
FIG. 6 is a righthand side view of the fastener held in the same position, with the righthand half portion thereof sectioned.

Now, the actual condition in which the fastener of the invention constructed as described above is put to use will be described with reference to FIG. 5 through FIG. 8. In the first place, a rectangular fitting hole 4a is bored through the stationary panel 4 for permitting passage therethrough of the legs 9, 9 of the fastener and screw receiving body 3 held in position between the legs. Then, the fastener 1 is pushed downwardly into the fitting hole 4a from one side (upper side) of the panel. In consequence of this forced insertion of the fastener, the receiving parts 13a, 13a of the receiving pieces 13, 13 thrusting sideways from the legs 9, 9 are bent inwardly by taking advantage of the gap 14 formed between the receiving pieces 13, 13, slid past the fitting hole 4a and, upon emergence from the other side (lower side) of the panel, allowed to resume their original form, with the result that the upper surfaces of the receiving parts 13a, 13a are opposed to the lower surface of the panel and, at the same time, the flange portion 7 is brought into intimate contact with the upper surface of the panel so that the fastener is secured to the panel (FIGS. 5 and 6). In this case, despite the resistance exerted upon the screw receiving body 3 in consequence of the passage of the receiving pieces 13, 13, the union of the fastener with the panel is easily accomplished by depressing the upper surface of the flange portion 7 because the screw receiving body is connected to the lower ends of the legs through the medium of the hinges 11, 11.

Subsequently, the other attaching panel 5 is placed on the upper surface of the aforementioned flange portion 7 in such a way that the perforation 5a formed in the panel coincides with the perforation 8 formed in the flange portion 7. The screw 6 is screwed in downwardly from above the panel until the leading end of the screw is brought into meshed engagement with the screw receiving hole 12 of the screw receiving body 3.

Figure 7:
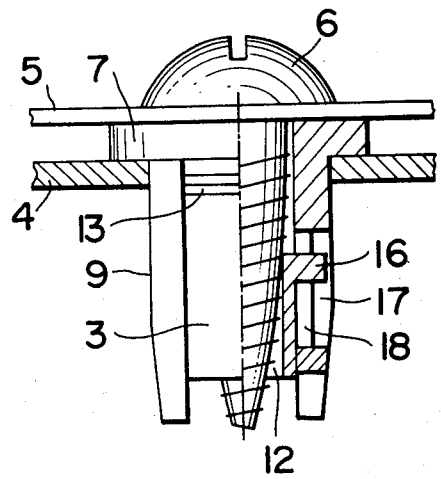
FIG. 7 is a front view of the fastener held in a position for actual service, with the righthand half portion thereof sectioned.
Figure 8:
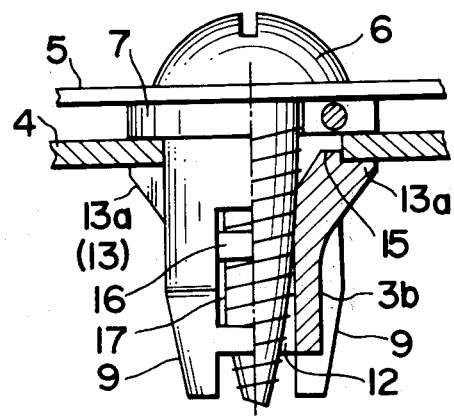
FIG. 8 is a righthand side view of the fastener held in the same position, with the righthand half portion thereof sectioned.

When the screw 6 is meshed with the screw receiving hole 12 as described above, the head portion of the screw 6 is received into the upper surface of the panel 5 and consequently brought into a restrained position. In consequence of the rotation of the screw 6, the screw receiving body 3 eventually severs itself from the hinges 11, 11 and continues to rise until the receiving pieces 13, 13 protruding sideways come into contact with the lower surface of the stationary panel 4. Consequently, the receiving pieces 13, 13 press the stationary panel 4 against the lower surface of the flange portion 7 and, at the same time, the head portion of the screw 6 exerts pressure upon the upper surface of the attaching panel 5. As a result, the two panels 4, 5 are fastened to each other through the medium of the fastener and the screw (FIGS. 7 and 8). In this case, since the aforementioned screw receiving body 3 causes the engaging protuberances 16, 16 to be engaged with the oblong guide holes 17, 17 of the legs 9, 9, it is not allowed to rotate in conjunction with the screw 6 and the screw 6 is allowed to be effectively driven into the screw receiving hole 12. At the same time, the screw receiving body 3 is allowed to ascend with the oblong guide holes as its guide. The receiving pieces 13, 13 which are caused to ascend and brought into intimate contact with the lower surface of the stationary panel 4 in consequence of the tightening of the aforementioned screw 6 have their respective engaging parts 15, 15 thrust into the fitting hole 4a and come into hooked engagement with the edge of the hole. Thus, the receiving pieces 13, 13 are prevented from being spread out by the tightening and are allowed effectively to get firm hold of the lower surface of the panel.

As described above, the fastener of the present invention permits the two panels to be securely fastened to each other by combining a work of pushing the fastener into the fitting hole 4a bored in the stationary panel 4 with a work of causing the screw 6 passed through the perforation in the attaching panel 5 to be driven into the screw receiving hole 12 of the screw receiving body 3. During the rotational insertion of the screw, since the otherwise possible co-rotation of the screw receiving body 3 is completely obstructed, the fastener enjoys an advantage that the fastening is accomplished easily and rapidly.

The fastener of the present invention is not brought into direct engagement with the inner walls of the fitting hole 4a of the stationary panel 4 by pressing the flange portion 7 of the basal body 2 and the receiving pieces 13 of the screw receiving body 3 respectively against the upper and lower surfaces of the edge of the fitting hole 4a. Thus, the fastener can safely be secured not only to metal panels but also to soft panels made such as of a synthetic resin material. Even when the panel given to be fastened is variable in thickness, since the fastener is so constructed as to be secured to the panel by virtue of the pressure exerted upon the upper and lower surfaces of the panel, it has another advantage of providing safe union of panels without being affected by the possible variation of the panel thickness.

Besides, the fastener of the present invention permits the fastened panels to be detached from each other by first loosening the screw 6 and then pulling the fastener out of the fitting hole 4a. In this case, the fastener lets go its firm hold of the stationary panel as the basal body 2 and the screw receiving body 3 come loose. Nevertheless, the two bodies mentioned above will not come off each other because the engaging protuberances 16, 16 are still held in engagement with the oblong guide holes 17, 17. The two panels, therefore, can be brought into reunion by driving the screw 6 into meshed engagement as described above. Because the fastener is prevented from disassemblage for the reason described above, it follows that the fastener will not fall off position even when the space under the stationary panel is not vacant and further that the fastener, when used as for fastening a part of the outer surface of a machine, provides convenience at the time that part is furbished or replaced.

Figure 2:
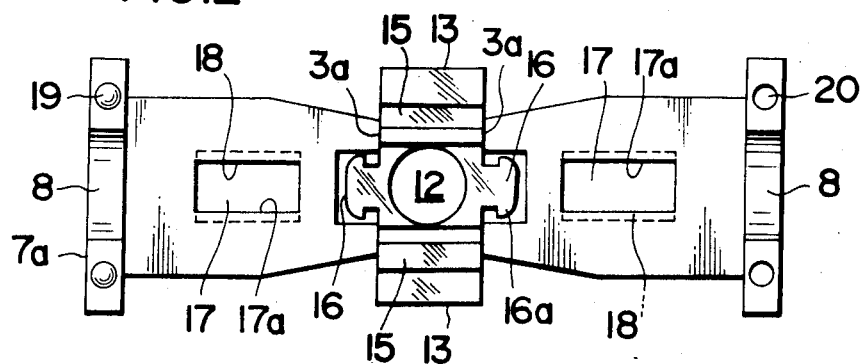
FIG. 2 is a plan view of the basal body of FIG. 1.
Figure 3:
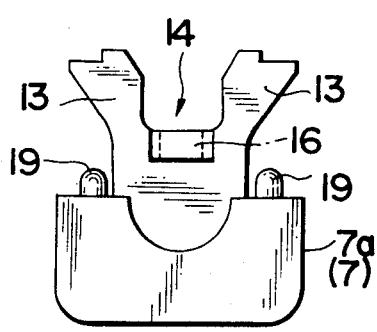
FIG. 3 is a righthand side view of the basal body of FIG. 1.
Figure 4:
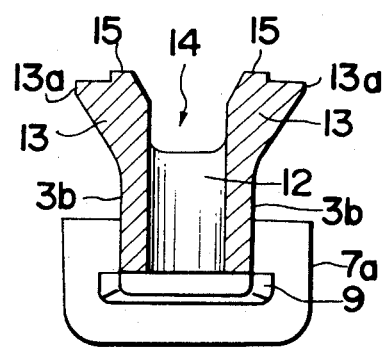
FIG. 4 is a lefthand side view of the basal body taken along the line IV—IV of FIG. 1.

Incidentally in the illustrated preferred embodiment, the fastener 1 is integrally molded in the shape shown in FIGS. 1 through 3, namely in a shape wherein the basal body forming one component of the fastener is divided into two halves along the central part of the flange portion 7 and the lower ends of the legs 9, 9 are connected to the lower ends of the screw receiving body 3 through the medium of the hinges 11, 11. Though this shape is preferably on account of the advantage enjoyed in the injection molding of the fastener with a synthetic resin material, it is not exclusive.

For example, the fastener may otherwise be obtained by molding the basal body 2 and the screw receiving body 3 separately of each other, disposing the screw receiving body 3 between the legs 9, 9 of the basal body 2 and bringing the engaging protuberances 16, 16 into engagement with the oblong guide holes 17, 17 to be formed in the legs.

While the preferred embodiment described above is so adapted that desired fastening is accomplished by disposing the stationary panel 4 between the flange portion 7 and the receiving pieces 13, 13, placing the attaching panel 5 on the upper surface of the flange portion 7 and driving the screw into meshed engagement, the two panels can otherwise be secured to each other by preparatorily joining the two panels 4, 5 with each other, disposing the joined panels between the flange portion 7 and the receiving pieces 13, 13 and driving the screw 6 into the screw receiving body 3. Choice between the two manners of fastening can suitably be made in due consideration of the place of use and the purpose of use, for example.

What is claimed is:

1. A fastener for panels, which fastener comprises a basal body provided with a flange portion having a circular perforation bored in the central portion thereof for permitting insertion therethrough of a screw and with a pair of legs extended downwardly from the lower surface of the flange portion so as to be opposed to each other across the line drawn perpendicularly through the center of said circular perforation, and a screw receiving body disposed between said opposed legs, provided in the upper portion thereof with a pair of receiving pieces protruding sideways out of the openings formed between said opposed legs and further provided with a screw receiving hole in the axial portion coinciding with said perpendicular line drawn through the center of said perforation, said screw receiving body being provided with engaging protuberances one each on the lateral surfaces thereof opposite said legs and said legs being provided with oblong guide holes adapted to receive said engaging protuberances into sliding contact, whereby the work of tightening a screw inserted past the perforation of said flange portion into the screw receiving hole of said screw receiving body causes the receiving pieces of the screw receiving body to be slid in the direction of the flange portion of the basal body and enables a panel interposed between the flange portion and the receiving pieces to be held in position therebetween, said flange portion of the basal body being divided into two halves and with the two halves of the flange portion being molded integrally one each with one of said pair of legs, the ends of the legs opposite said flange portion are each connected to the screw receiving body through the medium of frangible thin-walled hinges, whereby said basal body and said screw receiving body are integrally molded.

2. The fastener for panels according to claim 1, wherein the engaging protuberances on the opposite surfaces of the screw receiving body are provided at the leading ends thereof with engaging parts and the oblong guide holes in the legs are provided with stepped portions along the longitudinal edges of the openings, whereby the engaging protuberances are prevented from coming out of engagement.

3. A fastener for panels, which comprises a basal body provided with a flange portion having a circular perforation bored in the central portion thereof for permitting insertion therethrough of a screw and with a pair of legs extended downwardly from the lower surface of the flange portion so as to be opposed to each other across the line drawn perpendicularly through the center of said circular perforation, and a screw receiving body disposed between said opposed legs, provided in the upper portion thereof with a pair of receiving pieces protruding sideways out of the openings formed between said opposed legs and further provided with a screw receiving hole in the axial portion coinciding with said perpendicular line drawn through the center of said perforation, said screw receiving body being provided with engaging protuberances one each on the lateral surfaces thereof opposite said legs and said legs being provided with oblong guide holes adapted to receive said engaging protuberances into sliding contact, whereby the work of tightening a screw inserted past the perforation of said flange portion into the screw receiving hole of said screw receiving body causes the receiving pieces of the screw receiving body to be slid in the direction of the flange portion of the basal body and enables a panel interposed between the flange portion and the receiving pieces to be held in position therebetween, said two receiving pieces provided in the upper portion of the screw receiving body being interposed by an empty space so that two receiving pieces are freely bent inwardly toward each other.

4. The fastener for panels according to claim 3, wherein the legs of the basal body are molded each in the shape of a plate and the screw receiving body disposed between said legs is formed in a size enough to be completely contained within the empty space formed between the legs so that the lateral cross section of the fastener including the two legs is substantially rectangular and adapted for axial insertion into a complimentary aperture in said panel.

* * * * *